Figure 1:
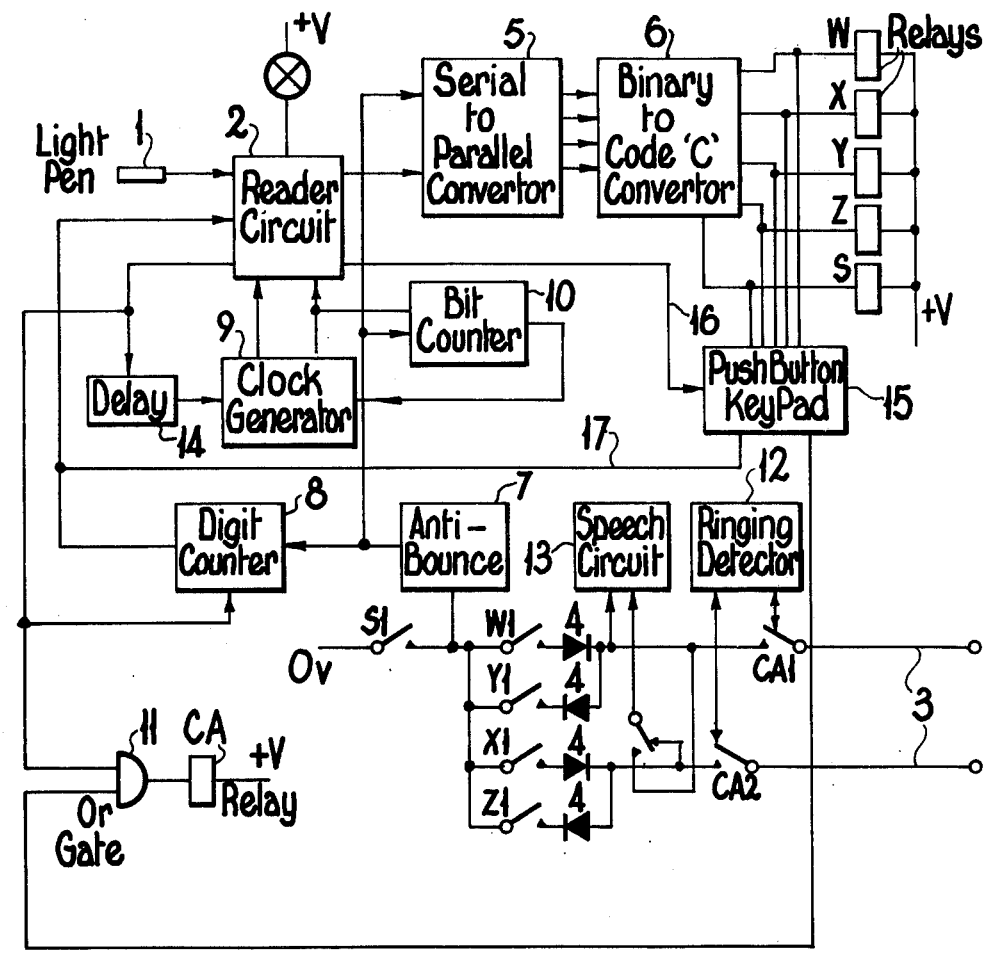

United States Patent [19]
Pakenham et al.

[11] 4,042,792
[45] Aug. 16, 1977

[54] TELEPHONE SUBSCRIBER'S APPARATUS FOR SIGNALLING DECIMAL DIGIT VALUES REPRESENTED IN PRINTED FORM

[75] Inventors: William Edward Pakenham, Wellingborough; Leonard Mayor Davis, Great Doddington, both of England

[73] Assignee: The General Electric Company Limited, London, England

[21] Appl. No.: 652,088

[22] Filed: Jan. 26, 1976

Related U.S. Application Data

[63] Continuation-in-part of Ser. No. 517,922, Oct. 25, 1974, abandoned.

[30] Foreign Application Priority Data

Oct. 25, 1973 United Kingdom ............... 49697/73

[51] Int. Cl.² ............................................. H04M 1/45
[52] U.S. Cl. ............................... 179/90 R; 179/90 CS
[58] Field of Search ............. 179/90, 2 DP; 250/227, 250/219 D

[56] References Cited

U.S. PATENT DOCUMENTS

| | | | |
|---|---|---|---|
| 3,523,161 | 8/1970 | Lewin | 179/2 DP |
| 3,601,552 | 8/1971 | Barnaby et al. | 179/90 B |
| 3,714,447 | 1/1973 | Jallais | 250/227 |
| 3,727,010 | 4/1973 | Fuyama et al. | 179/90 CS |
| 3,736,410 | 5/1973 | Ragland et al. | 179/90 CS |
| 3,860,765 | 1/1975 | McCabe et al. | 179/90 B |
| 3,870,830 | 3/1975 | Tapiei | 179/90 CS |

*Primary Examiner*—Kathleen H. Claffy
*Assistant Examiner*—Gerald L. Brigance
*Attorney, Agent, or Firm*—Kirschstein, Kirschstein, Ottinger & Frank

[57] ABSTRACT

Pushbutton telephone subscriber's apparatus in which there is provided a light pen arrangement for reading printed bar-code patterns representing series of decimal digit values, such as telephone numbers, and for converting the signal voltages obtained from reading these patterns to a form which can be signalled by the subscriber's apparatus over an associated telephone line. The bar code patterns may for example be printed in letter headings or in telephone directories adjacent the conventionally printed digit values.

2 Claims, 3 Drawing Figures

TELEPHONE SUBSCRIBER'S APPARATUS FOR SIGNALLING DECIMAL DIGIT VALUES REPRESENTED IN PRINTED FORM

This application is a continuation-in-part of application Ser. No. 517,922, filed Oct. 25, 1974, now abandoned.

The invention relates to telephone apparatus.

According to one aspect of the present invention apparatus at a telephone subscriber's station for signalling over an associated telephone line characters which are represented on a generally planar surface as a series of adjacent areas of detectably differing light reflecting properties, comprises manually operable means to illuminate a series of said areas in turn, means to derive a series of electric signals in dependence upon the light reflected from said series of areas, means temporarily to store said electric signals, signalling means to signal over said telephone line digit values of telephone numbers to be called, and means to apply said stored electric signals to an input of said signalling means for signalling over said telephone line.

Preferably said signalling means comprises a set of ten push buttons, one for each decimal digit value.

Figure 2:
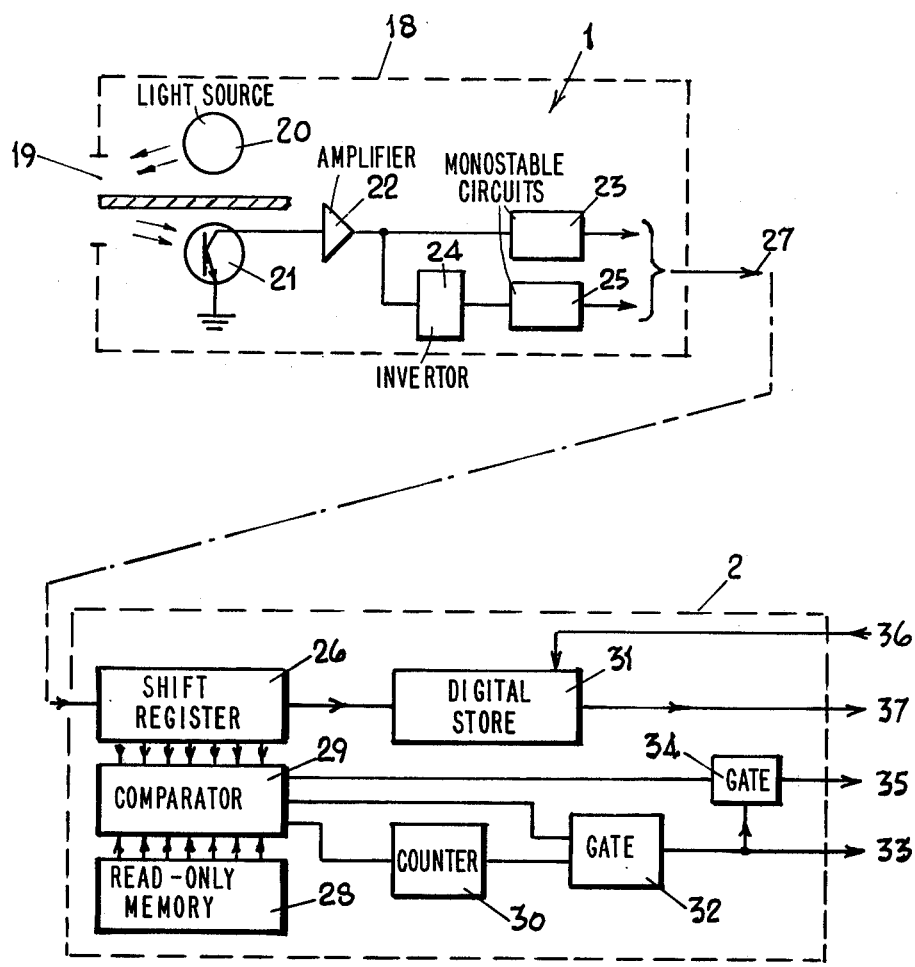
Figure 3:
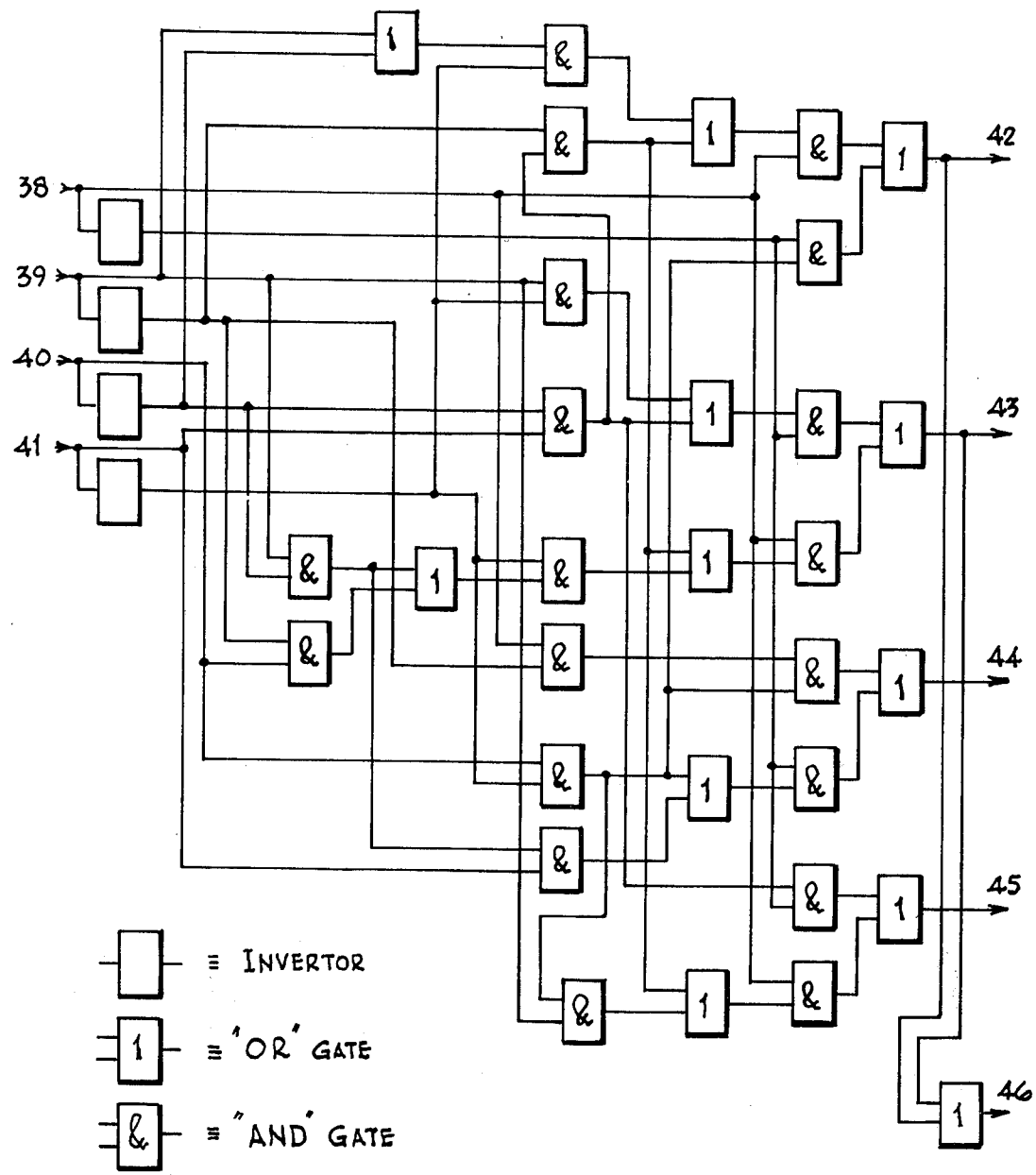

Telephone subscriber's apparatus in accordance with the present invention will now be described with reference to the accompanying drawings, of which FIG. 1 shows the apparatus schematically, and FIGS. 2 and 3 show parts of the apparatus of FIG. 1 in greater detail.

Referring first to FIG. 1 of the drawings a so-called light-pen 1 and its associated reader circuit 2 are arranged to apply digital signal values sensed by the light-pen 1 to the conductors of a telephone line 3 by "leg-signalling" technique in accordance with CCITT Code C. In this form of signalling, as described for example in U.S. Pat. Spec. No. 3,697,704, a digit value for transmission over the line 3 is represented by a respective combination of terminations applied to the line wires at the subscriber's apparatus, these terminations being open circuit, earth by way of one or other of the diodes 4 or a direct connection to earth. An alternating voltage is applied at the exchange end of the line 3 to each line wire, and the resulting current flow conditions are used to give an indication of the terminations applied at the subscriber's apparatus.

The digital signal values sensed by the light-pen 1 may for example be derived from a printed bar code pattern of alternate dark and light parallel bars, these bars being, say, point three inches high and either fifteen or five thousandths of an inch wide. The bar code pattern, which may represent in coded form the digit values of a telephone number, preceded by a distinctive "start" pattern and followed by a distinctive "stop" pattern, may for example be printed as part of a letter heading or in a telephone directory, adjacent the corresponding number "in clear". Each decimal character in the telephone is represented by four binary bits each consisting of a light and a dark bar, binary one being represented by a wide light bar followed by a narrow dark bar, and binary nought being represented by a narrow light bar followed by a wide dark bar.

Signals from the light-pen 1 and reader circuit 2, when the pen 1 is passed over the bar-code printed pattern, are of serial four-bit binary-coded decimal form and this serial signal form is applied to a serial-to-parallel mode convertor 5 which comprises four bistable stages connected in cascade, from which the four bits in respect of each digit value are applied in parallel to a binary-to-Code C convertor 6. The convertor 6 is arranged to energise a respective combination of relays W, X, Y and Z for each digit value, and contacts of these relays W1, X1, Y1 and Z1 are arranged to apply the corresponding terminations to the conductors of the line 3. A relay S is arranged to be energised for each digit value, and its contact S1, as well as applying earth potential to the contacts W1 to Z1, apply pulses by way of an anti-bounce circuit 7 to a digit counter 8.

Clockpulses from a source 9 are supplied to the reader circuit 2 and also to a bit counter 10, which counts up to four clockpulses during the transfer of the bits representing a digit value from the reader circuit 2 to the convertor 5 and then blocks further transfer clockpulses until operation of the relay S indicates correct signalling of the digit value to the line 3 and clears the counter 10 and the convertor 5. When data is available for signalling from the reader circuit 2 an output from that circuit is arranged to operate a relay CA, by way of an OR gate 11, whose contacts CA1 and CA2 change over to disconnect a ringing detector 12 from the line 3 and to connect the line 3 either to speech circuits 13 or the signalling diodes 4. The "data ready" output from the circuit 2 also initiates the application to the reader circuit 2 of the transfer clockpulses from the source 9, after an interval timed by a delay circuit 14 which enables dial tone to be returned to the subscriber's apparatus, and clears the digit counter 8.

The relays, W, X, Y and Z may if required be energised directly or through semi-conductor diodes by means of a conventional pushbutton keypad 15, each of, say, ten pushbuttons (not shown) being arranged when pressed to energise one or a combination of the relays to signal the corresponding digit value over the line 3. Operation of the light pen 1 and reader circuit 2 may be arranged to inhibit operation of the keypad 15, and vice versa, by way of paths 16 and 17 respectively.

Referring now to FIG. 2, the light-pen 1 comprises a generally cylindrical body 18 at one end of which there is provided a nozzle-like portion 19 which surrounds a light source 20 and a photo-transistor 21 which are shielded from one another such that light from the source 20 can only reach the photo-transistor 21 if it passes out of the nozzle and is reflected back in again from a reflective surface adjacent the nozzle. Electric signals from the photo-transistor 21 are passed by way of an amplifier 22 to a first monostable circuit 23 and an inverter 24, and from the inverter 24 to a second monostable circuit 25. One of these monostable circuits is arranged thereby to produce an output pulse in response to a high level of reflected light corresponding to a binary one bar bode while the other produces an output pulse for a low level of reflected light corresponding to a binary nought bar code, these pulses being fed to a shift register 26 at the input of the reader circuit 2 by way of a flexible connecting lead 27.

The reader circuit 2 includes a read-only memory unit 28 in which are held codes corresponding to the distinctive start and stop patterns and all the characters that the light-pen 1 may be required to detect. When the nozzle of the light-pen 1 is moved in the correct direction across a bar code pattern signals corresponding to the start pattern are entered in the shift register 26 and from there pass to a digital comparator 29, which checks the start pattern against the corresponding stored code. Subsequent characters as they are read are counted by a counter 30 and are transferred to a digital store 31. If any errors are detected by the comparator 29 or if an incorrect number of characters has been counted when the stop code is recognised, a gate circuit 32 applies an output over a path 33 to give a "read again" indication. If no errors are detected and the correct number of characters have been counted when the stop code is recognised a "data available" indication is given by way of a gate circuit 34 and a path 35.

The ditigal store 31 may comprise a sixty four stage shift register, so that a maximum of sixteen four bit binary coded characters may be stored at any one time. Transfer pulses from the source 9 are applied over a path 36 to read out four bits at a time over an output path 37 to the serial to parallel convertor 5.

Referring now to FIG. 3, which shows schematically the circuit of the binary to Code "C" convertor 6, the four parallel outputs from the serial to parallel convertor 5 are connected to inputs 38 to 41, and from there either directly or by way of inverter stages to a plurality of "AND" and "OR" gates, as shown. The operating signals for the relays W, X, Y, Z and S are derived from the outputs 42 to 46 of this circuit respectively.

It will be appreciated that the outputs from the convertor 6 or a similar circuit could be utilised with a different form of signalling, such as multiple tone signalling. In addition the arrangement described above may be used to transmit data over the telephone line once a connection has been set up, for example data relating to price and stock details of the kind increasingly used in supermarkets.

Alternatively the arrangement may form part of a signalling transmitter utilising multiple frequencies.

We claim:

1. Apparatus at a telephone subscriber's station for signalling over an associated telephone line decimal digit values which are each represented on a generally planar surface as a series of adjacent areas of detectably differing light reflecting properties, comprising
    A. a set of ten push-buttons, one for each decimal digit valve,
    B. signalling means for signalling the identity of a wanted subscriber, said signalling means being arranged to be connected to said associated telephone line,
    C. means to apply to said signalling means electric signals representing decimal digit values in response to operation of respective ones of said push-buttons,
    D. manually-operable light pen means to illuminate a series of said areas in turn and to derive a series of signal voltages of values representing decimal digits, dependent upon the respective levels of light reflected from said series of areas,
    E. means temporarily to store said signal voltages, and
    F. convertor means to apply to said signalling means electric signals in respect of the decimal digit value represented by said stored signal voltages.

2. Apparatus at a telephone subscriber's station in accordance with claim 1 wherein the digit values are signalled over the associated telephone line by means of respective combinations of a plurality of different terminations applied to the wires of said line at said subscriber's station.

* * * * *